(12) United States Patent
Iwaki et al.

(10) Patent No.: US 11,308,087 B2
(45) Date of Patent: Apr. 19, 2022

(54) COST DISTRIBUTION CONSTRUCTION FOR PESSIMISTIC TREE SEARCH

(71) Applicant: INTERNATIONAL BUSINESS MACHINES CORPORATION, Armonk, NY (US)

(72) Inventors: Ryo Iwaki, Tokyo (JP); Takayuki Osogami, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 16/850,851

(22) Filed: Apr. 16, 2020

(65) Prior Publication Data
US 2021/0326342 A1    Oct. 21, 2021

(51) Int. Cl.
*G06F 16/22* (2019.01)
*G06F 16/2453* (2019.01)

(52) U.S. Cl.
CPC .... *G06F 16/24545* (2019.01); *G06F 16/2246* (2019.01)

(58) Field of Classification Search
CPC .............. G06F 16/24545; G06F 16/2246
USPC .................................................. 707/720
See application file for complete search history.

(56) References Cited

U.S. PATENT DOCUMENTS

| | | | |
|---|---|---|---|
| 9,104,201 B1 | 8/2015 | Pillai et al. | |
| 9,944,366 B2 | 4/2018 | Tang | |
| 10,268,909 B2 | 4/2019 | Sathyanarayana et al. | |
| 10,789,853 B2* | 9/2020 | Priest | G08G 5/0026 |
| 2012/0203420 A1* | 8/2012 | Kim | G05D 1/08 |
| | | | 701/25 |
| 2016/0055275 A1* | 2/2016 | Wang | G06Q 50/30 |
| | | | 703/8 |
| 2017/0069214 A1* | 3/2017 | Dupray | G08G 5/0021 |
| 2019/0327124 A1* | 10/2019 | Lai | H04B 1/38 |
| 2020/0041539 A1* | 2/2020 | Nakaoka | G01C 25/00 |

OTHER PUBLICATIONS

Dentler et al., "A Real-time Model Predictive Position Control with Collision Avoidance for Commercial Low-cost Quadrotors*", 2016 IEEE Conference on Control Applications (CCA), Sep. 2016, pp. 519-525.

(Continued)

*Primary Examiner* — Kuen S Lu
(74) *Attorney, Agent, or Firm* — Tutunjian & Bitetto PC; Joseph Petrokaitis

(57) ABSTRACT

A computer-implemented method is provided for evaluating a next action of a target object in an environment. The method includes simulating, by a hardware processor for each of possible actions of the target object in the environment, a next state occurring thereafter to obtain a plurality of simulated next states, based on a pessimistic scenario which is randomly generated by sampling a plurality of costs from a distribution of cost. The distribution of cost is an area where the target object is likely to visit in a near future. The method further includes identifying, by the hardware processor, a safety area for the target object in each of the plurality of simulated next states. The method also includes evaluating, by the hardware processor, each of the possible actions of the target object, based on the safety area.

18 Claims, 11 Drawing Sheets

(56) References Cited

OTHER PUBLICATIONS

Mell et al. "The NIST Definition of Cloud Computing", NIST Special Publication 800-145, 2011, 7 pages.
Statt, "Skydio R1 Autonomous Drone Review: Cruise Control", The Verg, Dec. 2019, Pageds 1-15.
U.S. Office Action issued in U.S. Appl. No. 16/419,214 dated Feb. 22, 2021, pp. 1-13.

* cited by examiner

US 11,308,087 B2

COST DISTRIBUTION CONSTRUCTION FOR PESSIMISTIC TREE SEARCH

BACKGROUND

The present invention generally relates to query systems, and more particularly to cost distribution construction for real time pessimistic tree search.

In many applications where agents make sequential decision making (e.g. drones find safe flight routes and move), they must consider how the environment and the behaviors of other agents change dynamically depending on the actions they take. When the model of the environment is available, Monte Carlo tree search is effective, though its high computational cost prevents real time application.

SUMMARY

According to aspects of the present invention, a computer-implemented method is provided for evaluating a next action of a target object in an environment. The method includes simulating, by a hardware processor for each of possible actions of the target object in the environment, a next state occurring thereafter to obtain a plurality of simulated next states, based on a pessimistic scenario which is randomly generated by sampling a plurality of costs from a distribution of cost. The distribution of cost is an area where the target object is likely to visit in a near future. The method further includes identifying, by the hardware processor, a safety area for the target object in each of the plurality of simulated next states. The method also includes evaluating, by the hardware processor, each of the possible actions of the target object, based on the safety area.

According to other aspects of the present invention, a computer program product is provided for evaluating a next action of a target object in an environment. The computer program product includes a non-transitory computer readable storage medium having program instructions embodied therewith. The program instructions are executable by a computer to cause the computer to perform a method. The method includes simulating, for each of possible actions of the target object in the environment, a next state occurring thereafter to obtain a plurality of simulated next states, based on a pessimistic scenario which is randomly generated by sampling a plurality of costs from a distribution of cost. The distribution of cost is an area where the target object is likely to visit in a near future. The method further includes identifying a safety area for the target object in each of the plurality of simulated next states. The method also includes evaluating each of the possible actions of the target object, based on the safety area.

According to yet other aspects of the present invention, a computer processing system is provided for evaluating a next action of a target object in an environment. The computer processing system includes a memory device including program code stored thereon. The computer processor system further includes a hardware processor, operatively coupled to the memory device, and configured to run the program code stored on the memory device to simulate, for each of possible actions of the target object in the environment, a next state occurring thereafter to obtain a plurality of simulated next states, based on a pessimistic scenario which is randomly generated by sampling a plurality of costs from a distribution of cost. The distribution of cost is an area where the target object is likely to visit in a near future. The hardware processor further runs the program code to identify a safety area for the target object in each of the plurality of simulated next states. The processor also runs the program code to evaluate each of the possible actions of the target object, based on the safety area.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to cost distribution construction for real time pessimistic tree search.

One or more embodiments of the present invention are directed to generating a Pessimistic Scenario (PS) by using a Distribution of Cost (DoC) supported in the possible future position of the object under control in order to evaluate its action. DoC is an area where the object is likely to visit in the near future, expected from the current state (position, velocity and acceleration) and the action under evaluation.

In one or more embodiments, in each action evaluation step, the PS for each candidate action is randomly generated by sampling future costs using the DoC. PSs vary with respect to each other over time due to the randomness of the sampling from the DoC. In this way, it is expected that the action sequence which is safe in average is chosen. The use of DoC enables the PS to take something not in consideration into consideration in an abstract manner.

Figure 1:
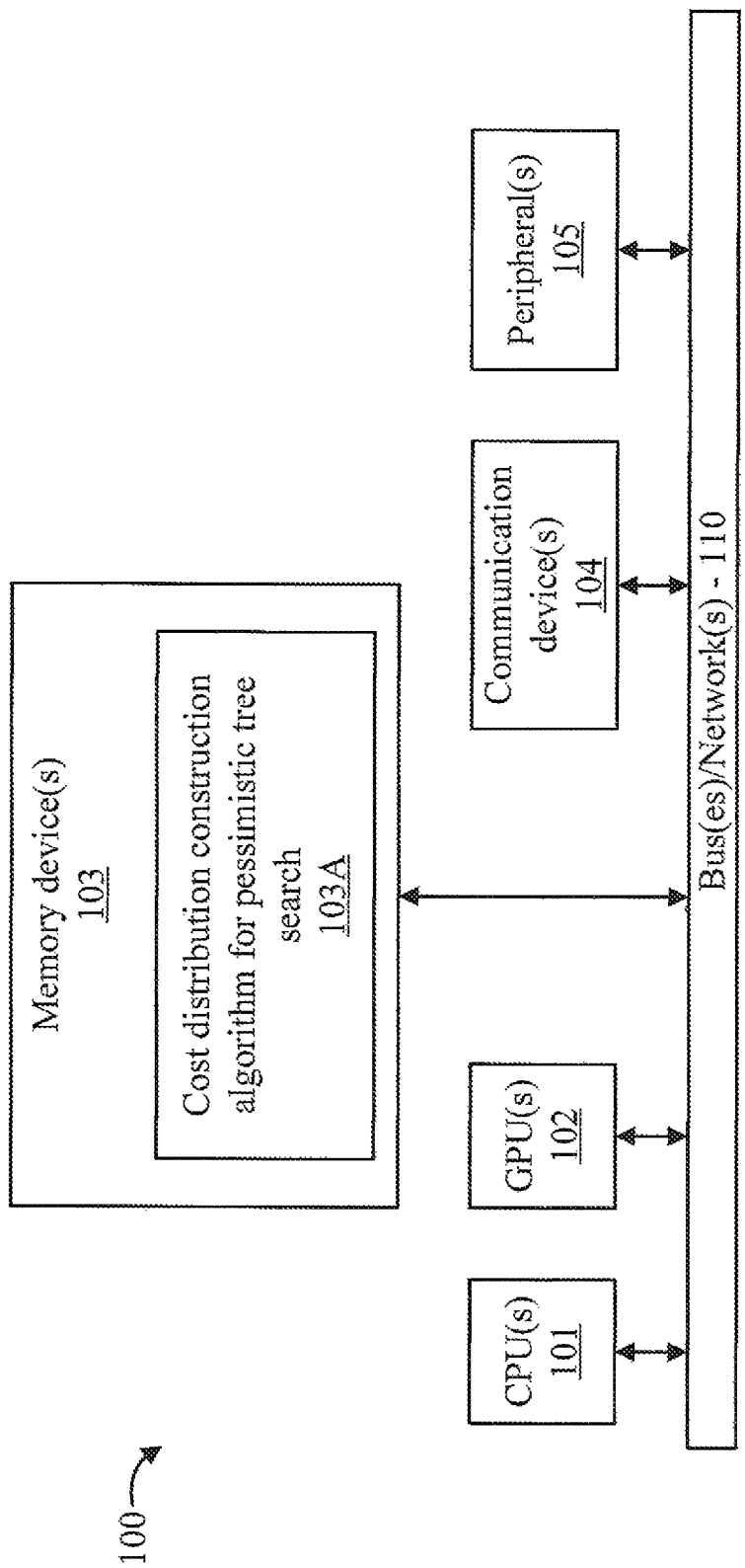
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, memory devices 103 store a cost distribution algorithm 103A for pessimistic tree search.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 10-11). One or more of the methods described herein can be performed using a cloud configuration. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
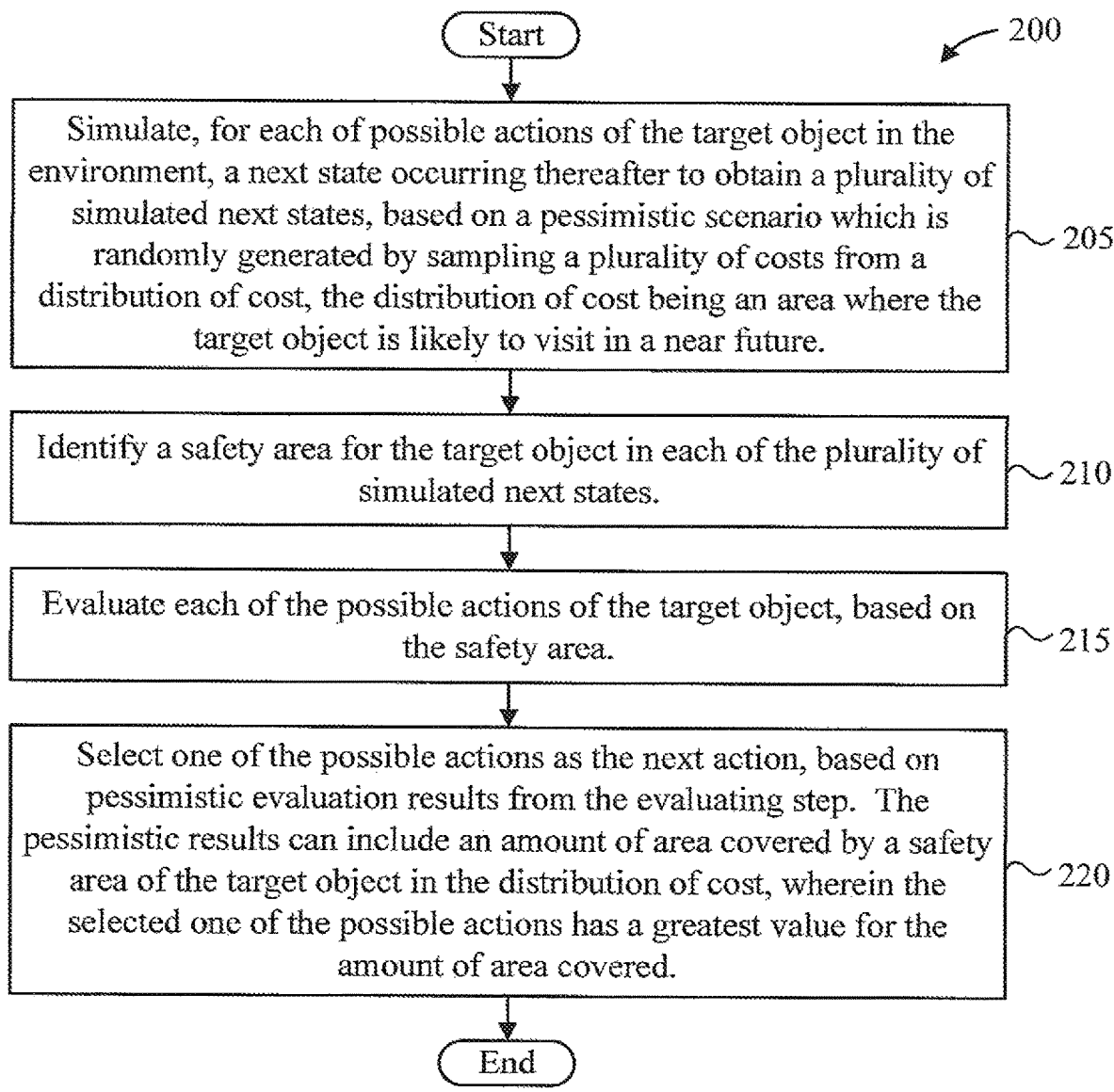
FIG. 2 is a flow diagram showing an exemplary method for evaluating a next action of a target object in an environment, in accordance with an embodiment of the present invention.

FIG. 2 is a flow diagram showing an exemplary method 200 for evaluating a next action of a target object in an environment, in accordance with an embodiment of the present invention.

At block 205, simulate, for each of possible actions of the target object in the environment, a next state occurring thereafter to obtain a plurality of simulated next states, based on a pessimistic scenario which is randomly generated by sampling a plurality of costs from a distribution of cost, the distribution of cost being an area where the target object is likely to visit in a near future.

At block 210, identify a safety area for the target object in each of the plurality of simulated next states.

At block 215, evaluate each of the possible actions of the target object, based on the safety area.

At block 220, select one of the possible actions as the next action, based on pessimistic evaluation results from the evaluating step. The pessimistic results can include an amount of area covered by a safety area of the target object in the distribution of cost, wherein the selected one of the possible actions has a greatest value for the amount of area covered.

Figure 3:
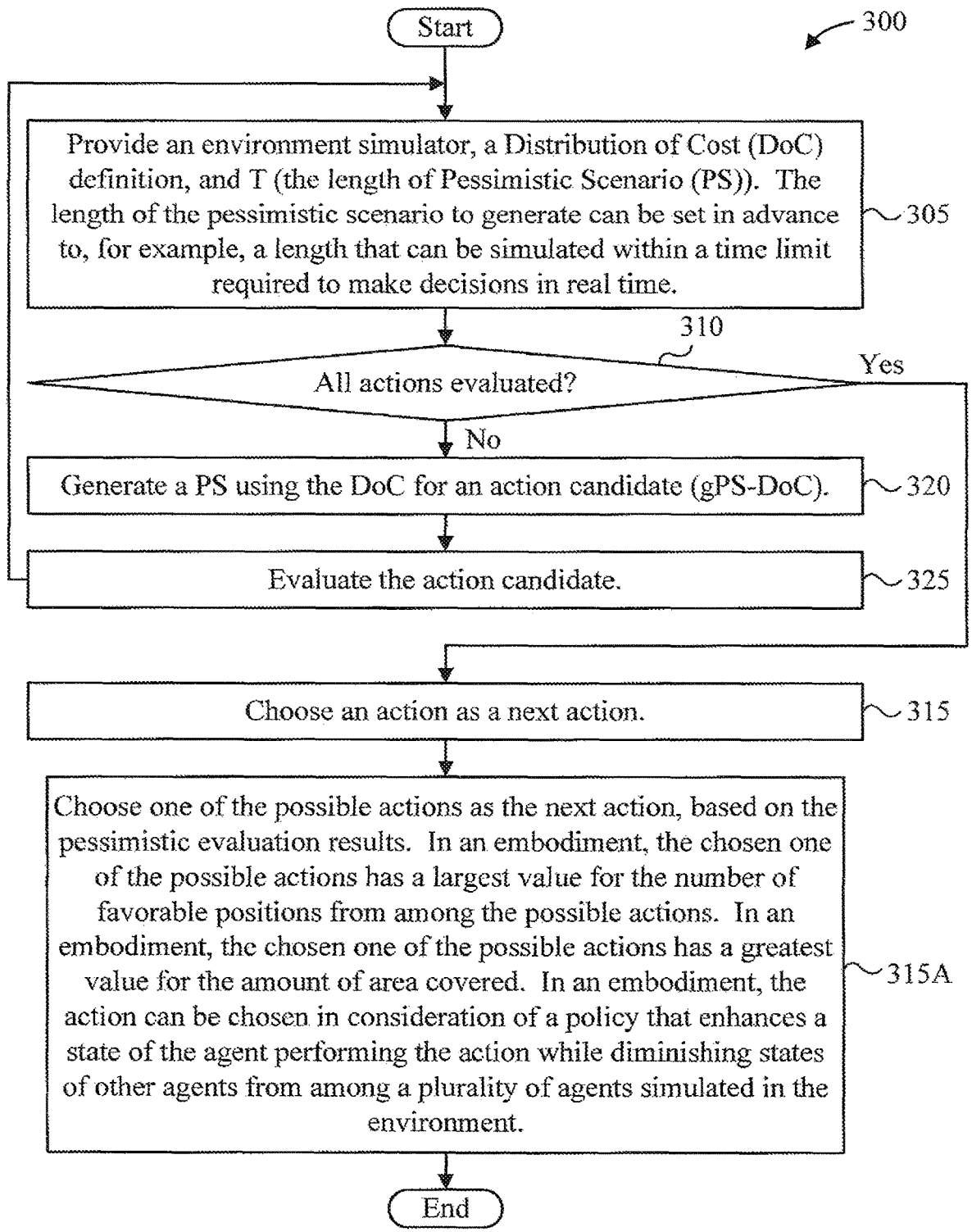
FIG. 3 is a flow diagram showing an exemplary method for evaluating and choosing a next action of a target object in an environment, in accordance with an embodiment of the present invention.

FIG. 3 is a flow diagram showing an exemplary method 300 for evaluating and choosing a next action of a target object in an environment, in accordance with an embodiment of the present invention.

At block 305, provide an environment simulator, a Distribution of Cost (DoC) definition, and T (the length of Pessimistic Scenario (PS)). The length of the pessimistic scenario to generate can be set in advance to, for example, a length that can be simulated within a time limit required to make decisions in real time.

At block 310, determine whether or not all actions have been evaluated. If so, then proceed to block 325. Otherwise, proceed to block 315.

At block 315, choose an action as a next action.

In an embodiment, block 315 can include block 315A.

At block 315A, choose one of the possible actions as the next action, based on the pessimistic evaluation results. In an embodiment, the chosen one of the possible actions has a largest value for the number of favorable positions from among the possible actions. In an embodiment, the chosen one of the possible actions has a greatest value for the amount of area covered. In an embodiment, the action can be chosen in consideration of a policy that enhances a state of the agent performing the action while diminishing states of other adversarial agents from among a plurality of agents simulated in the environment.

At block 320, generate a PS using the DoC for an action candidate (gPS-DoC).

At block 325, evaluate the action candidate.

Figure 4:
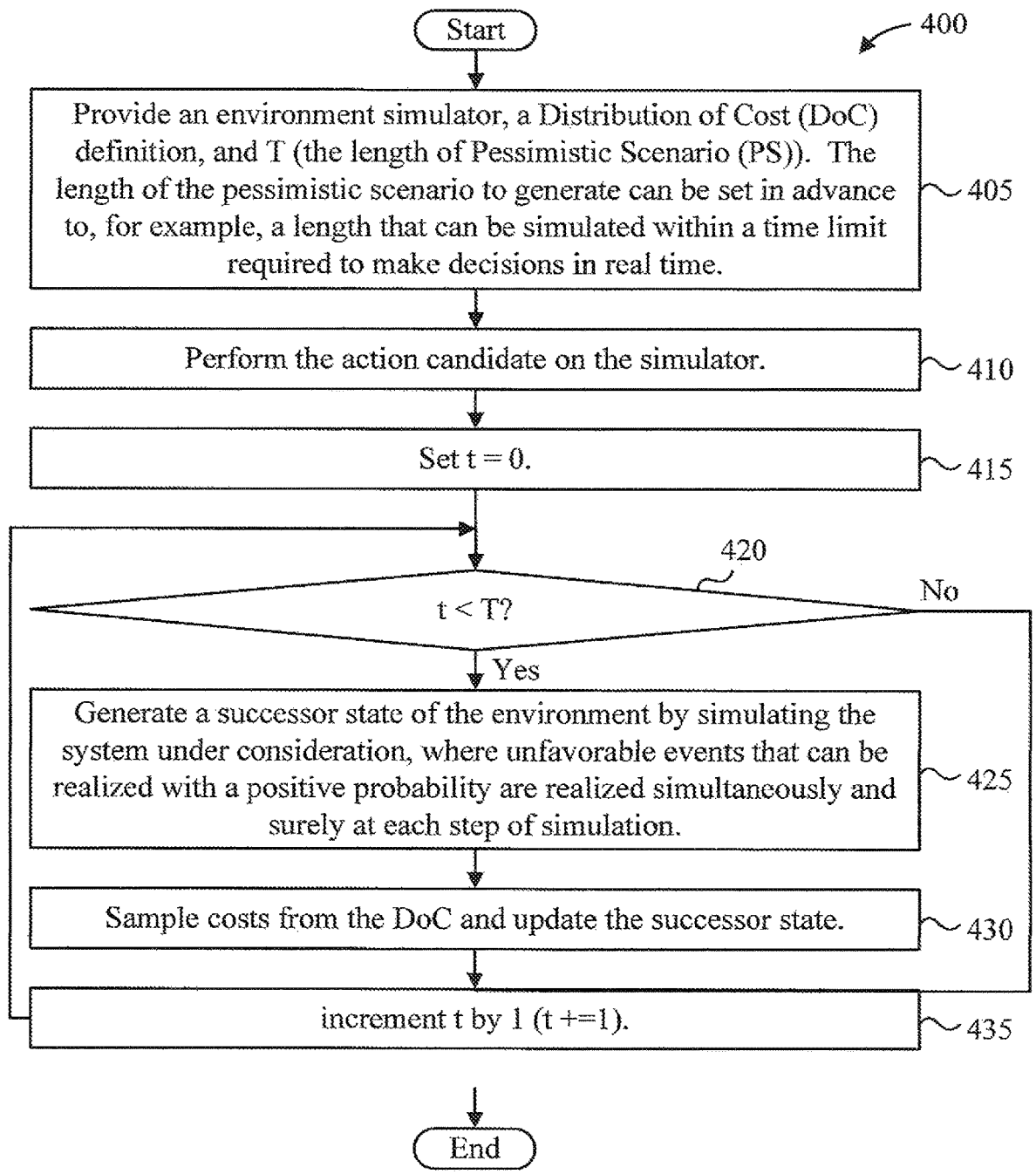
FIG. 4 is a flow diagram showing an exemplary method for generating a Pessimistic Scenario using a Distribution of Cost, in accordance with an embodiment of the present invention.

FIG. 4 is a flow diagram showing an exemplary method 400 for generating a Pessimistic Scenario using a Distribution of Cost, in accordance with an embodiment of the present invention. In an embodiment, method 400 corresponds to block 320 of method 300 of FIG. 3.

At block 405, provide an environment simulator, a Distribution of Cost (DoC) definition, and T (the length of Pessimistic Scenario (PS)). The length of the pessimistic scenario to generate can be set in advance to, for example, a length that can be simulated within a time limit required to make decisions in real time.

At block 410, perform the action candidate on the simulator.

At block 415, set t=0.

At block 420, determine whether t<T. If so, the proceed to block 425. Otherwise, terminate the method.

At block 425, generate a successor state of the environment by simulating the system under consideration, where unfavorable events that can be realized with a positive probability are realized simultaneously and surely at each step of simulation.

At block 430, sample costs from the DoC and update the successor state.

At block 435, increment t by 1 (t+=1).

Figure 5:
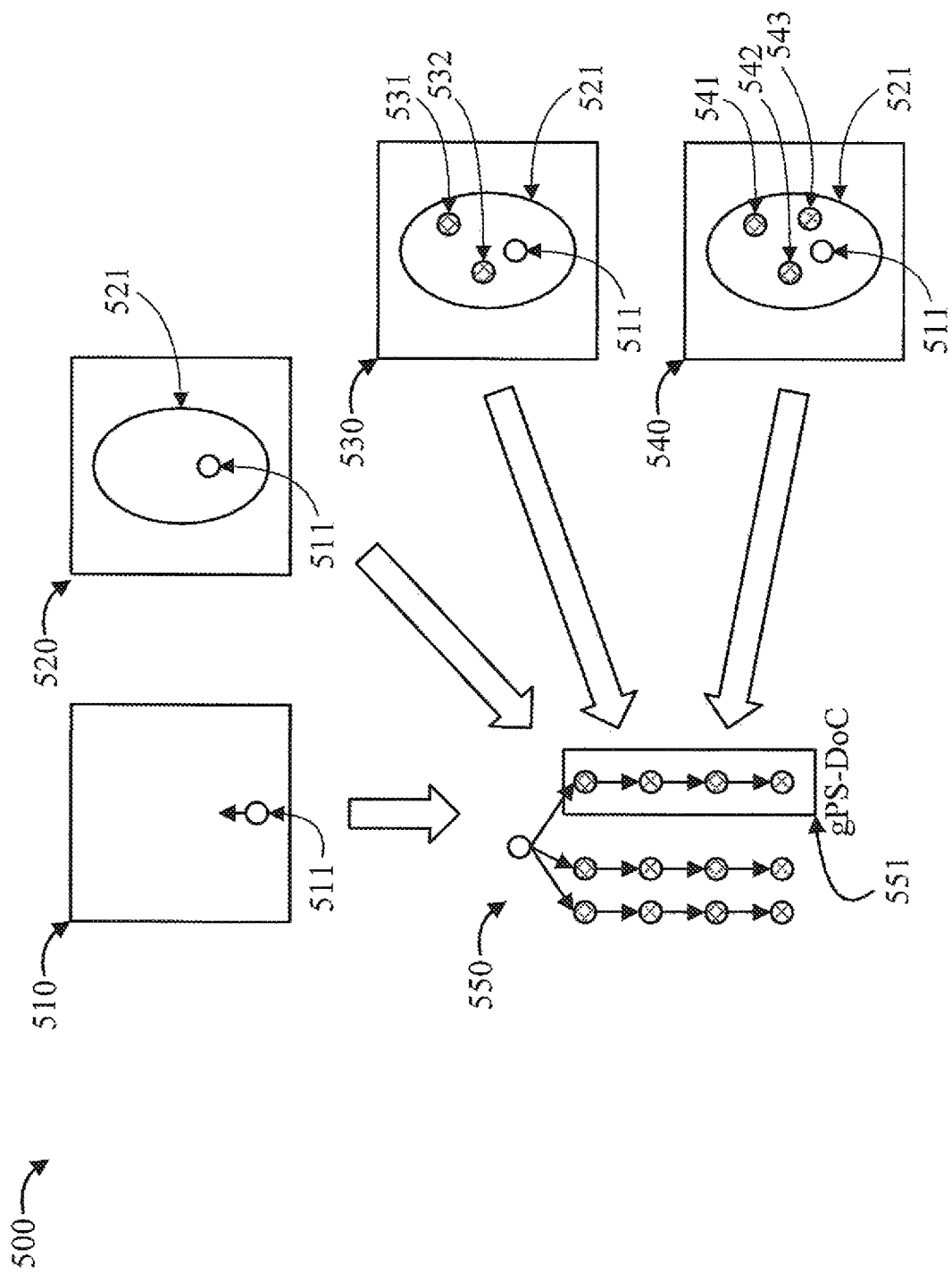
FIG. 5 is a block diagram showing an exemplary aspects of the present invention, in accordance with an embodiment of the present invention.

FIG. 5 is a block diagram showing an exemplary aspects 500 of the present invention, in accordance with an embodiment of the present invention.

Block 510 shows a moving object 511 under control.

Block 520 shows a Distribution of Cost (Doc) 521 and a position 522 after taking the action.

Blocks 530 and 540 show the random sampling of costs 531, 532 in block 530 and costs 541, 542, 543, and 544 in block 540.

In view of the preceding, a tree 550 of various Pessimistic Scenarios (PSs) 551, each of which including a respective action sequence.

Thus, Pessimistic Scenarios (PSs) are generated by using a Distribution of Cost (DoC) 521 supported in the possible future position of the object under control in order to evaluate the object's action. The DoC 521 is an area where the object is likely to visit in the near future, expected from the current state (position, velocity and acceleration) and the action under evaluation.

In one or more embodiments, in each action evaluation step, the PS 551 for each candidate action is randomly generated by sampling future costs (per blocks 530 and 540) using the DoC 521. PSs 551 vary with respect to each other over time due to the randomness of the sampling from the DoC 521. In this way, it is expected that the action sequence which is safe in average is chosen. The use of the DoC 521 enables the PS 551 to take something not in consideration into consideration in an abstract manner.

Figure 6:
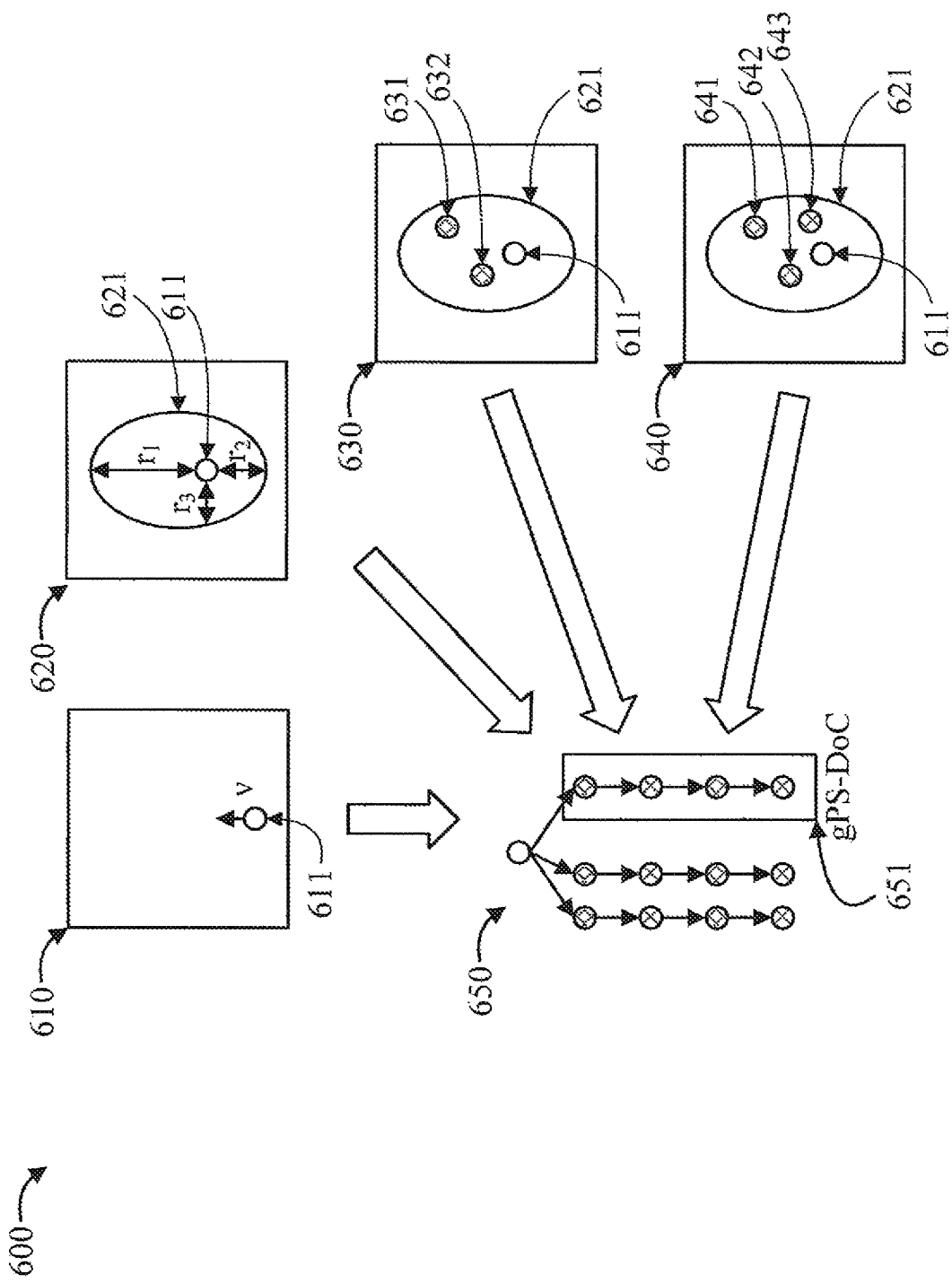
FIG. 6 is a block diagram showing an exemplary drone flight to which the present invention can be applied, in accordance with an embodiment of the present invention.

FIG. 6 is a block diagram showing an exemplary drone flight 600 to which the present invention can be applied, in accordance with an embodiment of the present invention.

Block 610 shows a moving object 611 under control.

Block 620 shows a Distribution of Cost (Doc) 621 and a position 622 after taking the action.

Blocks 630 and 640 show the random sampling of costs 631, 632 in block 630 and costs 641, 642, 643, and 644 in block 640.

In view of the preceding, a tree 650 of various Pessimistic Scenarios (PSs) 651, each of which including a respective action sequence.

The purpose is to find a safe flight route considering what cannot be detected beforehand, e.g. sudden bird attack.

Cost is defined as an obstacle.

The DoC 621 is defined as an ellipse whose size is determined by the displacement which is calculated by linear motion with maximum acceleration.

For example, with respect to the DoC 621 and the position 622, the following applies:

$$r_1 = |v_t + \tfrac{1}{2} a_{max} t^2|$$

$$r_2 = |v_t - \tfrac{1}{2} a_{max} t^2|$$

$$r_3 = \tfrac{1}{2} a_{max} t^2$$

The PS 651 is generated by sampling obstacles uniformly from the DoC 621.

The maximum acceleration might be specified beforehand and could be dependent on the direction.

The length of linear motion, t, is specified in advance.

Figure 7:
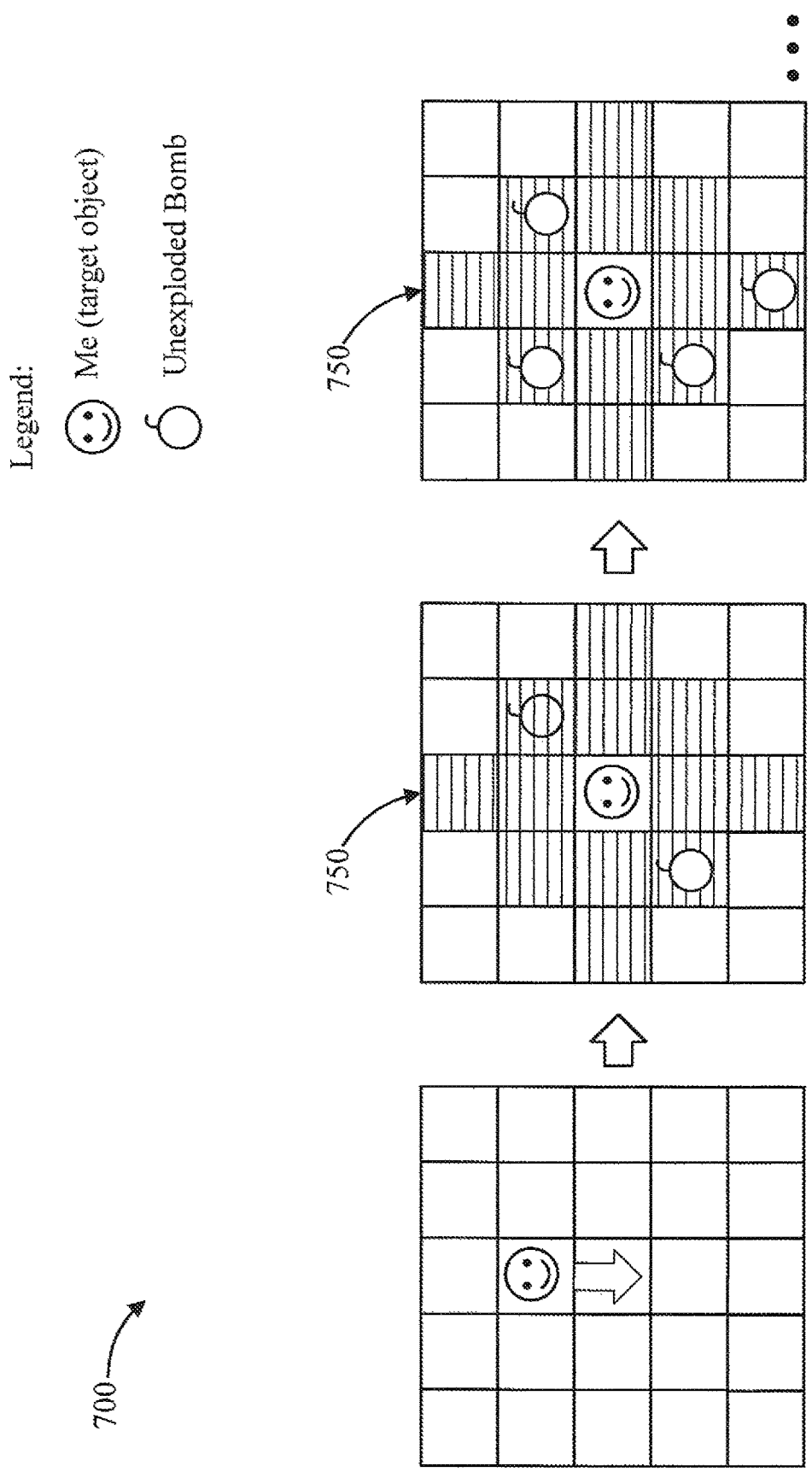
FIG. 7 is a block diagram showing an exemplary application to which the present invention can be applied, in accordance with an embodiment of the present invention.

FIG. 7 is a block diagram showing an exemplary application 700 to which the present invention can be applied, in accordance with an embodiment of the present invention.

The application 700 involves a user avoiding bombs in his/her path.

The purpose or goal of the application is to survive by avoiding bombs that randomly appear.

Cost is defined as a bomb.

The DoC is defined as a Manhattan ball 750 (horizontal line hatched regions in the middle and right portions of FIG. 7).

The maximum movement allowed to an agent is one square in each step.

This is a special case where both velocity and acceleration are one but agent always stops after the movement.

The PS is generated by sampling bombs uniformly from the DoC.

The radius of the DoC is determined in advance.

Figure 8:
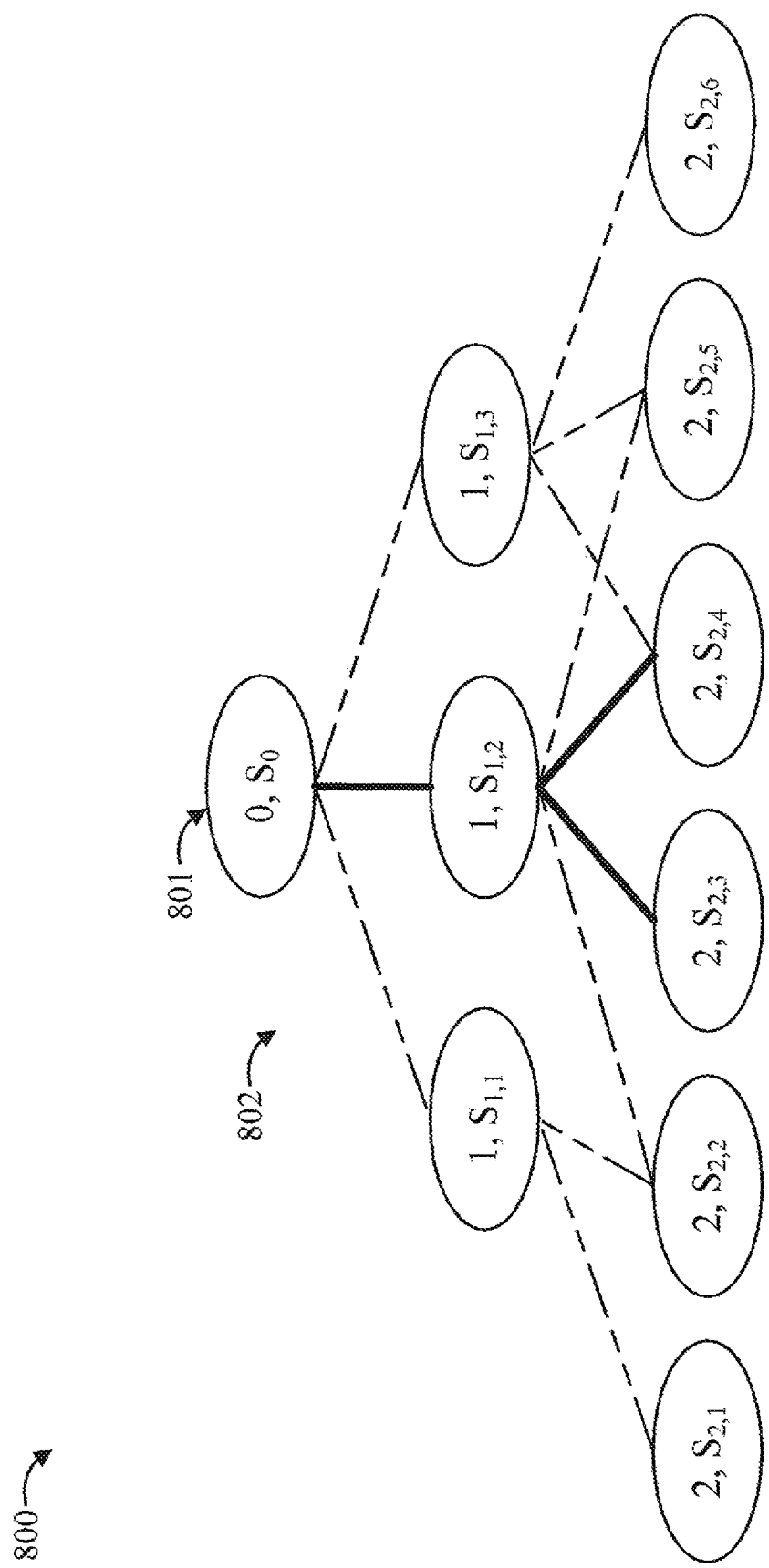
FIG. 8 is a diagram showing a pessimistic survivability tree, in accordance with an embodiment of the present invention.

FIG. 8 is a diagram showing a pessimistic survivability tree 800, in accordance with an embodiment of the present invention. The pessimistic survivability tree 800 includes a root node 801, and leaf nodes 802 at various hierarchical levels (here level L0 through L2, with the root at L0 and the leaves at L1 and L2), where each hierarchical level represents a different time step. Each node of the pessimistic survivability tree includes time-state-pairs. As shown in the nodes, the first character of the time-state pairs is an integer representing a time step (here, 0, 1 or 2) and the following characters represent a current state and a possible next state preceded by the prefix S, with the current state and the possible next state denoted as subscripts with respect to the prefix S. Of course, other conventions can be used, given the teachings of the present invention provided herein. Based on the pessimistic survivability tree, an agent attempts to survive (or satisfy any and all constraints in decision making) against a powerful adversarial opponent who can take multiple actions and transition into multiple states in each time step in a nondeterministic manner.

In an embodiment, each node can be associated with real values, and an action can be chosen based on the real values. The real values can represent how likely the powerful adversarial opponent will actually be at the node or how likely any and all constraints are satisfied in decision making.

Figure 9:
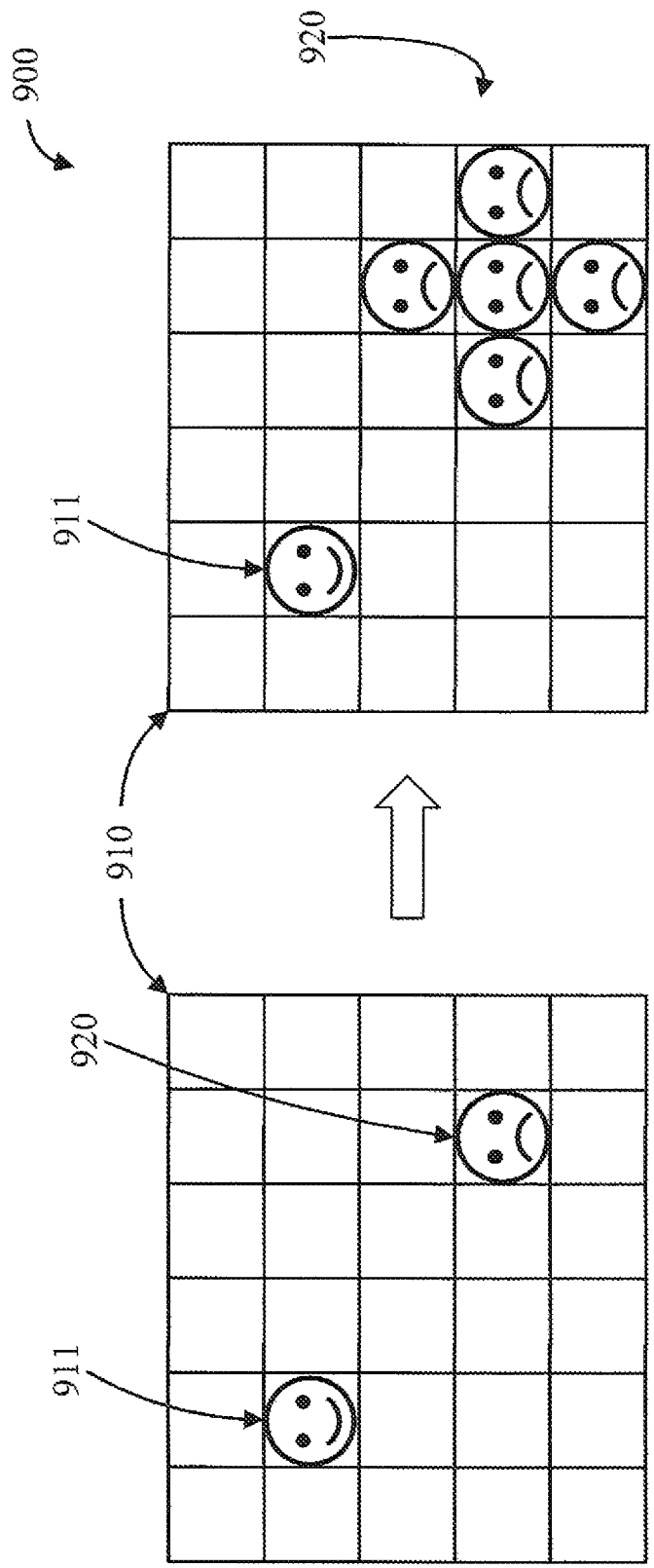
FIG. 9 is a diagram showing the generating of an exemplary pessimistic scenario, in accordance with an embodiment of the present invention.

FIG. 9 is a diagram showing the generating of an exemplary pessimistic scenario 900, in accordance with an embodiment of the present invention.

An input for the pessimistic scenario 900 involves an environment 910 having an object under control (hereinafter interchangeably referred to as the "target object" 311 and represented by a happy (smiling) face) and one or more other objects (e.g., a powerful adversarial opponent(s), a car(s), a pedestrian(s), etc. 920 and represented by a sad (frowning) face), from which the pessimistic scenario 900 as shown on the right side is formed. In the example of FIG. 9, a single powerful adversarial opponent 920 is involved as shown on the left. As shown on the right, the pessimistic scenario 900 involves the powerful adversarial opponent 920 taking multiple actions simultaneously (noting the occupation of multiple different locations simultaneously by the powerful adversarial opponent 920). While the other object (powerful adversarial opponent 920) cannot occupy two spots simultaneously in reality, for the purpose of simulation in accordance with the present invention, all unfavorable actions (e.g., spot occupations) occur in the simulation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
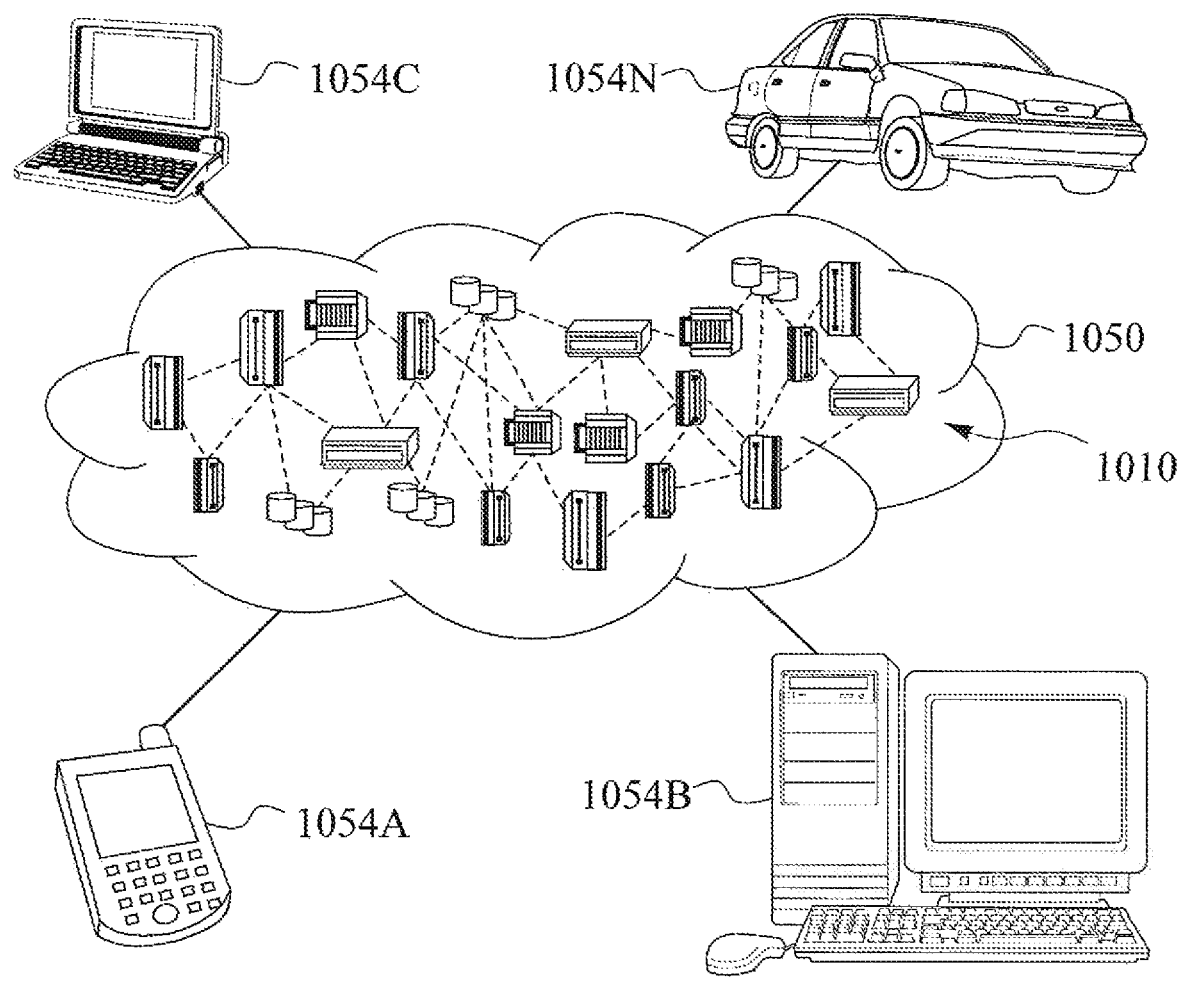
FIG. 10 is a block diagram showing an illustrative cloud computing environment having one or more cloud computing nodes with which local computing devices used by cloud consumers communicate, in accordance with an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
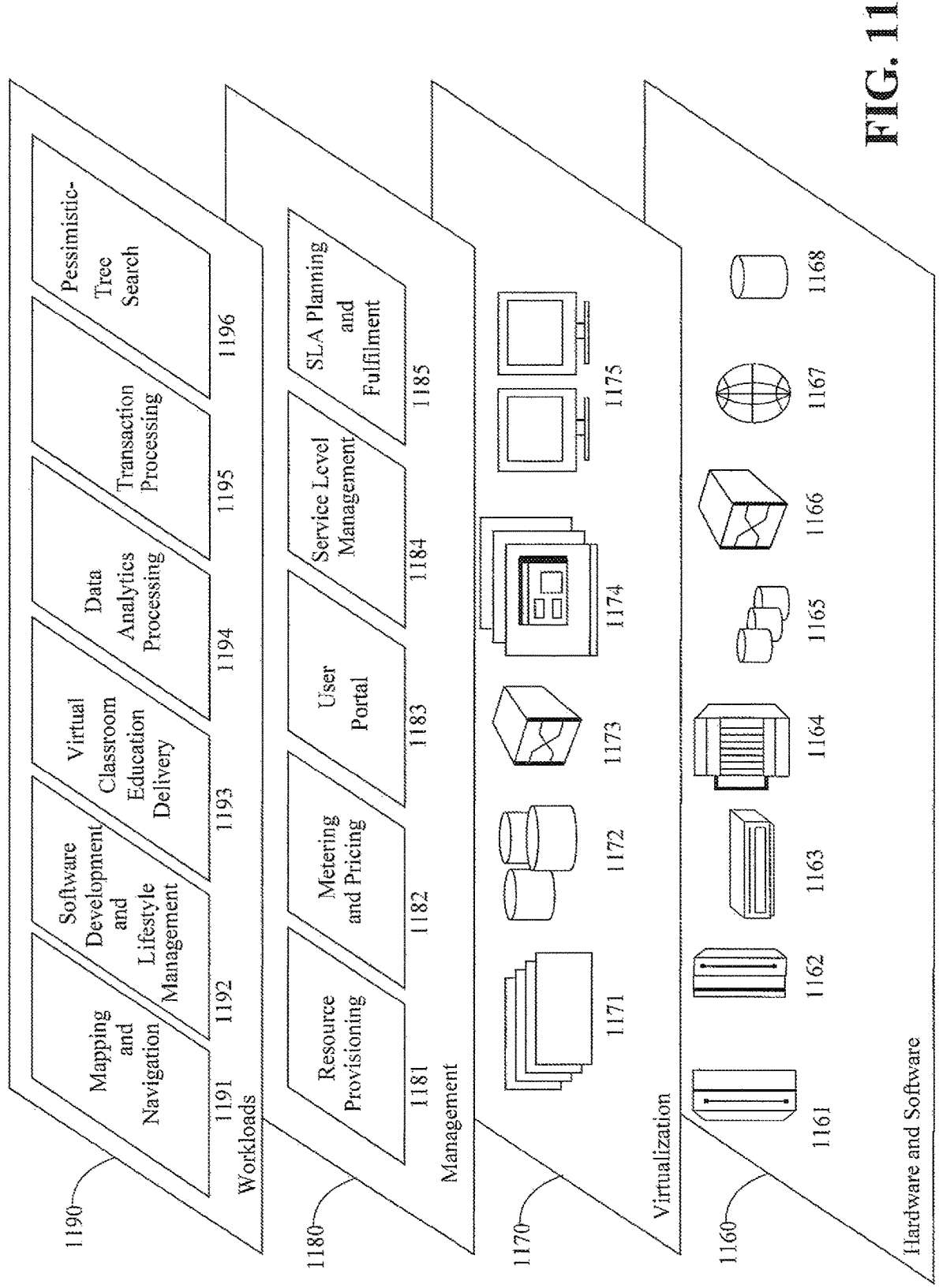
FIG. 11 is a block diagram showing a set of functional abstraction layers provided by a cloud computing environment, in accordance with an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 10160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and cost distribution construction for real time pessimistic tree search 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for evaluating a next action of a target object in an environment, comprising:
    simulating, by a hardware processor for each of possible actions of the target object in the environment, a next state occurring thereafter to obtain a plurality of simulated next states, based on a pessimistic scenario which is randomly generated by sampling a plurality of costs from a distribution of cost, the distribution of cost being an area where the target object is to visit in a future;
    identifying, by the hardware processor, a safety area for the target object in each of the plurality of simulated next states; and
    evaluating, by the hardware processor, each of the possible actions of the target object, based on the safety area,
    wherein the plurality of costs are one or more obstacles, the target object is drone, and the distribution of cost is defined as an ellipse whose size is determined by a displacement which is calculated by a linear motion with a maximum acceleration.

2. The computer-implemented method of claim 1, wherein said simulating step is repeated a predetermined number of times to obtain the plurality of simulated next states.

3. The computer-implemented method of claim 2, wherein the predetermined number of times is set so that said simulating step is performed within a time limit to make decisions in real time that affect a performance of the next action.

4. The computer-implemented method of claim 1, further comprising selecting one of the possible actions as the next action, based on pessimistic evaluation results from said evaluating step.

5. The computer-implemented method of claim 1, wherein the pessimistic results comprise an amount of area covered by a safety area of the target object in the distribution of cost, wherein the selected one of the possible actions has a greatest value for the amount of area covered.

6. The computer-implemented method of claim 1, wherein costs in the distribution of costs are defined as obstacles.

7. The computer-implemented method of claim 1, wherein the distribution of cost is defined as an ellipse whose size is determined by a displacement from a cost, representing an obstacle, to an outer surface of the ellipse.

8. The computer-implemented method of claim 1, wherein the displacement is calculated as a distance from the cost to an end point of a radius of the ellipse starting at a location of the cost.

9. The computer-implemented method of claim 1, wherein the pessimistic scenario is randomly generated by uniformly sampling the plurality of costs from the distribution of cost.

10. The computer-implemented method of claim 1, wherein the distribution of cost is determined with respect to a current state and an action under evaluation, the current state involving position, velocity, and acceleration.

11. The computer-implemented method of claim 1, further comprising receiving a user-specified parameter defining a length of linear motion capable of being taken by the target object.

12. A computer program product for evaluating a next action of a target object in an environment, the computer program product comprising a non-transitory computer readable storage medium having program instructions embodied therewith, the program instructions executable by a computer to cause the computer to perform a method comprising:
    simulating, for each of possible actions of the target object in the environment, a next state occurring thereafter to obtain a plurality of simulated next states, based on a pessimistic scenario which is randomly generated by sampling a plurality of costs from a distribution of cost, the distribution of cost being an area where the target object is to visit in a future;

identifying a safety area for the target object in each of the plurality of simulated next states; and evaluating each of the possible actions of the target object, based on the safety area, wherein the plurality of costs are one or more obstacles, the target object is drone, and the distribution of cost is defined as an ellipse whose size is determined by a displacement which is calculated by a linear motion with a maximum acceleration.

13. The computer program product of claim 12, wherein the method further comprises selecting one of the possible actions as the next action, based on pessimistic evaluation results from said evaluating step.

14. The computer program product of claim 12, wherein the pessimistic results comprise an amount of area covered by a safety area of the target object in the distribution of cost, wherein the selected one of the possible actions has a greatest value for the amount of area covered.

15. The computer program product of claim 12, wherein costs in the distribution of costs are defined as obstacles.

16. The computer program product of claim 12, wherein the distribution of cost is defined as an ellipse whose size is determined by a displacement from a cost, representing an obstacle, to an outer surface of the ellipse.

17. The computer program product of claim 12, wherein the displacement is calculated as a distance from the cost to an end point of a radius of the ellipse starting at a location of the cost.

18. A computer processing system for evaluating a next action of a target object in an environment, comprising:

a memory device including program code stored thereon;

a hardware processor, operatively coupled to the memory device, and configured to run the program code stored on the memory device to simulate, for each of possible actions of the target object in the environment, a next state occurring thereafter to obtain a plurality of simulated next states, based on a pessimistic scenario which is randomly generated by sampling a plurality of costs from a distribution of cost, the distribution of cost being an area where the target object is to visit in a future;

identify a safety area for the target object in each of the plurality of simulated next states; and evaluate each of the possible actions of the target object, based on the safety area, wherein the plurality of costs are one or more obstacles, the target object is drone, and the distribution of cost is defined as an ellipse whose size is determined by a displacement which is calculated by a linear motion with a maximum acceleration.

\* \* \* \* \*